(12) United States Patent
Mueller

(10) Patent No.: US 8,079,434 B2
(45) Date of Patent: Dec. 20, 2011

(54) CYLINDER HEAD COOLING SYSTEM FOR A MOTORCYCLE

(75) Inventor: Matthew J. Mueller, Wauwatosa, WI (US)

(73) Assignee: Harley-Davidson Motor Company Group, Inc., Milwaukee, WI (US)

(*) Notice: Subject to any disclaimer, the term of this patent is extended or adjusted under 35 U.S.C. 154(b) by 355 days.

(21) Appl. No.: 12/365,216

(22) Filed: Feb. 4, 2009

(65) Prior Publication Data
US 2010/0193276 A1    Aug. 5, 2010

(51) Int. Cl.
*B60K 11/06* (2006.01)

(52) U.S. Cl. .................... 180/68.1; 180/229; 123/41.58; 123/41.66

(58) Field of Classification Search .............. 180/229, 180/68.1; 123/41.58, 41.66
See application file for complete search history.

(56) References Cited

U.S. PATENT DOCUMENTS

| | | |
|---|---|---|
| 3,894,521 A | 7/1975 | Sakasegawa et al. |
| 4,577,720 A | 3/1986 | Hamane et al. |
| 4,618,019 A | 10/1986 | Ando et al. |
| 4,632,070 A * | 12/1986 | Onda et al. ............... 123/41.58 |
| 4,735,278 A | 4/1988 | Komuro et al. |
| 4,964,484 A * | 10/1990 | Buell ........................ 180/219 |
| 5,152,361 A | 10/1992 | Hasegawa et al. |
| 5,301,767 A * | 4/1994 | Shiohara .................. 180/219 |
| 5,915,344 A | 6/1999 | Suzuki et al. |
| 5,992,554 A | 11/1999 | Hasumi et al. |
| 6,105,701 A * | 8/2000 | Buell ........................ 180/229 |
| 6,382,169 B1 | 5/2002 | Gausman |
| 6,601,667 B2 | 8/2003 | Buell et al. |
| 7,556,115 B2 * | 7/2009 | Iwanaga .................. 180/229 |
| 2003/0010558 A1* | 1/2003 | Buell et al. .............. 180/229 |
| 2008/0289893 A1* | 11/2008 | Iwanaga .................. 180/229 |

\* cited by examiner

*Primary Examiner* — Paul N Dickson
*Assistant Examiner* — Marlon Arce
(74) *Attorney, Agent, or Firm* — Michael Best & Friedrich LLP

(57) ABSTRACT

A motorcycle including a frame and an engine and transmission assembly coupled to the frame. The engine and transmission assembly includes at least one cylinder head assembly having a cooling port and defining a cooling passageway in fluid communication with the cooling port and passing through at least a portion of the cylinder head assembly. The motorcycle also includes a conduit coupled to the cooling port and a fan in fluid communication with the conduit and operable at an operating speed to draw air from the cooling passageway, and move air through the cooling port and through the conduit.

26 Claims, 5 Drawing Sheets

CYLINDER HEAD COOLING SYSTEM FOR A MOTORCYCLE

BACKGROUND

The present invention relates to engine cooling systems, and more particularly, to cylinder head cooling systems for air-cooled engines of motorcycles.

During operation, combustion events in motorcycle engines generate heat that may contribute to rider discomfort. In air-cooled engines, heat is generally dissipated to the atmosphere through cooling fins extending from cylinders and cylinder head assemblies of the engine. The cooling fins are most effective to remove heat from the engine when the motorcycle is moving at relatively high speeds. At rest and low speeds, the cooling fins are less effective causing the cylinder head assemblies, which are generally in closest proximity to the rider, to increase in temperature. Some motorcycles use a fan to draw air across the cooling fins on the sides of the cylinders and cylinder head assemblies to assist in removing heat from the engine at rest and low speed conditions.

SUMMARY

One construction of the invention is directed to a motorcycle including a frame and an engine and transmission assembly coupled to the frame. The engine and transmission assembly includes at least one cylinder head assembly having a cooling port and defining a cooling passageway in fluid communication with the cooling port and passing through at least a portion of the cylinder head assembly. The motorcycle also includes a conduit coupled to the cooling port and a fan in fluid communication with the conduit and operable at an operating speed to draw air from the cooling passageway, and move air through the cooling port and through the conduit.

Another construction of the invention is directed to a motorcycle including a frame having a hollow portion defining an interior volume and including a frame inlet port and a frame outlet in fluid communication with the interior volume. The motorcycle also includes an engine and transmission assembly coupled to the frame. The engine and transmission assembly includes at least one cylinder head assembly having a cooling port and defining a cooling passageway passing through at least a portion of the cylinder head assembly. A fan is in fluid communication with the cooling passageway and operable at an operating speed to draw air from the cooling passageway, move air through the cooling port, the frame inlet port, the interior volume, and the frame outlet.

An additional construction of the invention is directed to a motorcycle including a frame having a steering head and a hollow backbone portion coupled to the steering head and extending rearwardly of the steering head. The hollow backbone portion defines an interior volume and includes a rear frame inlet port, a front frame inlet port, and a frame outlet in fluid communication with the interior volume. The motorcycle also includes an engine and transmission assembly coupled to the frame and including a V-type internal-combustion engine having rear and front cylinder head assemblies. The rear cylinder head assembly includes a rear cooling port and defines a rear cooling passageway in fluid communication with the rear cooling port and passing through at least a portion of the rear cylinder head assembly. The front cylinder head assembly includes a front cooling port and defines a front cooling passageway in fluid communication with the front cooling port and passing through at least a portion of the front cylinder head assembly. A rear conduit is coupled between the rear cooling port and the rear frame inlet port, and a front conduit is coupled between the front cooling port and the front frame inlet port. A fan is positioned downstream of the front and rear cylinder head assemblies. The fan is operable at an operating speed to draw air from the rear cooling passageway, move air through the rear cooling port, through the rear conduit, through the rear frame inlet port, through the interior volume, and through the frame outlet in a downstream direction. The fan is also operable at the operating speed to draw air from the front cooling passageway, move air through the front cooling port, through the front conduit, through the front frame inlet port, through the interior volume, and through the frame outlet.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
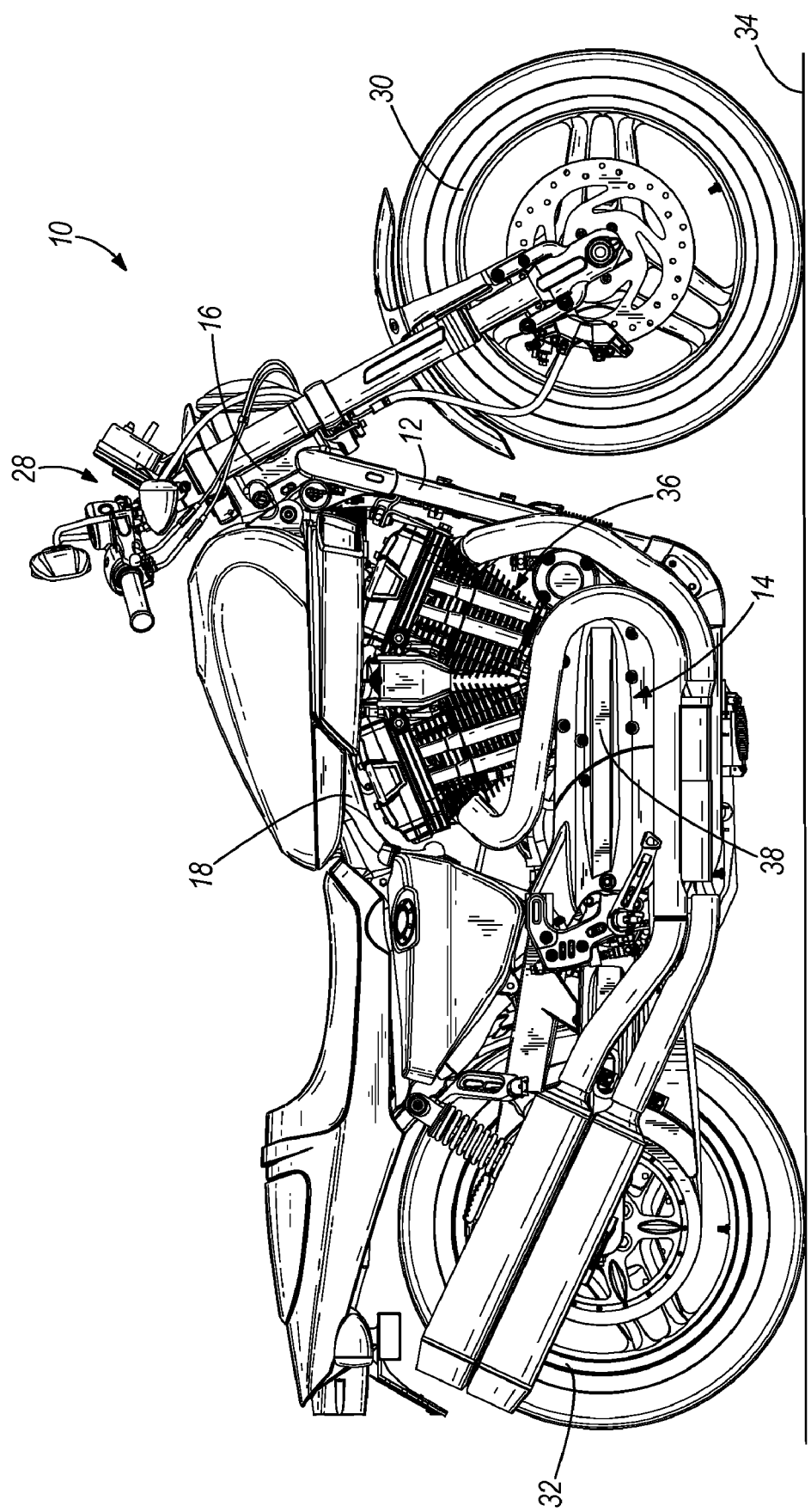
FIG. 1 is a side view of a motorcycle according to one construction of the invention
Figure 2:
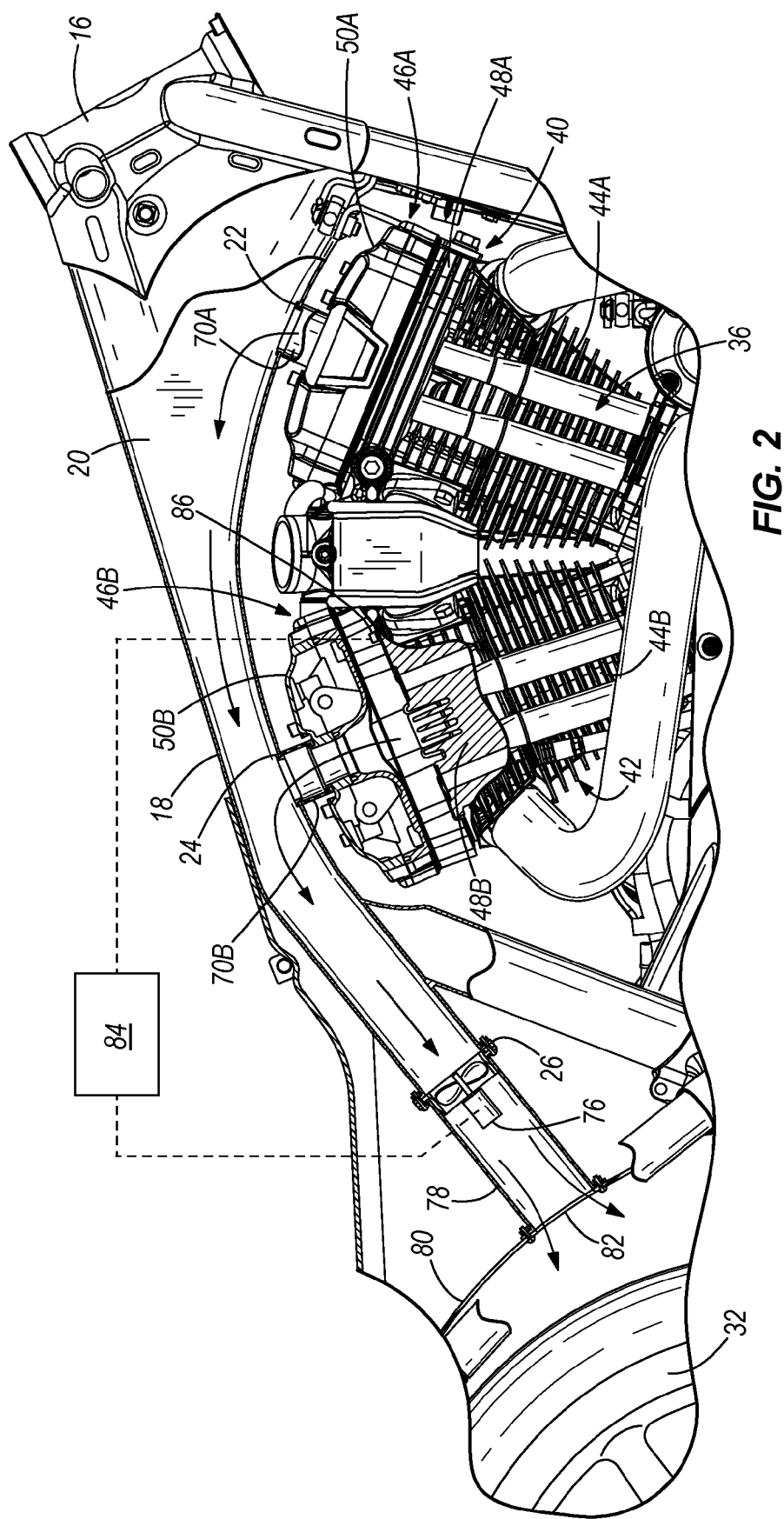
FIG. 2 is an enlarged partially cut-away side view of portions of the motorcycle shown in FIG. 1.

FIG. 1 illustrates a motorcycle 10 that includes a frame 12 and an engine and transmission assembly 14 coupled to the frame 12. As shown in FIG. 2, the frame 12 includes a steering head 16 and a backbone 18 extending rearwardly of the steering head 16. The backbone 18 is a hollow portion of the frame 12 and defines an internal cavity 20. The backbone 18 includes a front frame inlet port 22 and a rear frame inlet port 24 positioned rearwardly of the front frame inlet port 22. The front and rear frame inlet ports 22, 24 are in fluid communication with the interior cavity 20. The frame 12 also includes a frame outlet 26 in fluid communication with the interior cavity 20.

Referring back to FIG. 1, the motorcycle 10 includes a steering assembly 28 pivotably coupled to the steering head 16 and a front wheel 30 rotatably mounted to the steering assembly 28. The motorcycle 10 includes a rear wheel 32 rotatably coupled to a rear portion of the frame 12. The front and rear wheels 30, 32 support the motorcycle 10 on a riding surface 34. The engine and transmission assembly 14 is operably coupled to the rear wheel 32 for rotating the rear wheel 32 and moving the motorcycle 10 forward. The steering assembly 28 is pivoted to steer the motorcycle 10 when in motion.

With reference to FIG. 2, the engine and transmission assembly 14 includes an engine 36 having a crankcase 38, a front cylinder assembly 40 that extends upwardly and forwardly from the crankcase 38, and a rear cylinder assembly 42 that extends upwardly and rearwardly from the crankcase 38. The front and rear cylinder assemblies 40,42 are arranged with respect to one another to define a "V-twin" engine configuration. In the illustrated "V-twin" engine configuration the cylinder assemblies 40, 42 are orientated at a 45 degree angle with respect to each other.

The front and rear cylinder assemblies 40, 42 are substantially similar mirror images of each other and therefore mainly the structure of the rear cylinder assembly 42 will be described in detail. The structure of the front cylinder assembly 40 will be identified by reference numbers including the reference letter "A". The corresponding structure of the rear cylinder assembly 42 will be identified with corresponding reference numbers including the reference letter "B".

The rear cylinder assembly 42 includes a cylinder 44B and a cylinder head assembly 46B coupled to a top end (i.e., deck) of the cylinder 44B. The cylinder 44B includes external cooling fins and internally defines a cylinder bore (not shown) that receives a piston (not shown).

The cylinder head assembly 46B includes a cylinder head 48B and a rocker box 50B coupled to the top of the cylinder head 48B. The cylinder head 48B includes external cooling fins and caps the cylinder bore to define a combustion chamber (not shown) with the cylinder bore and the piston. The cylinder head 48B includes an exhaust passageway (not shown) and an exhaust valve (not shown) movable to selectively open the combustion chamber to the exhaust passageway to allow exhaust gases to escape the combustion chamber. The cylinder head 48B also includes an intake passageway (not shown) and an intake valve (not shown) movable to selectively open the combustion chamber to the intake passageway to allow intake air and/or fuel into the combustion chamber.

The rocker box 50B includes a base 52B coupled to the top of the cylinder head 48B and a cover 54B coupled to the base 52B such that the cover 54B and the base 52B define a rocker chamber 56B. Inside the rocker chamber 56B, rockers (not shown) are pivotally supported to actuate the intake and exhaust valves in response to movement of pushrods (not shown) of the engine and rotation of camshafts (not shown) of the engine.

The piston reciprocates inside the cylinder bore in timed relationship to the valves to compress fuel and air received from the intake passageway prior to a combustion event and to expel the products of combustion from the combustion chamber and through the exhaust passageway after the combustion event.

Figure 3:
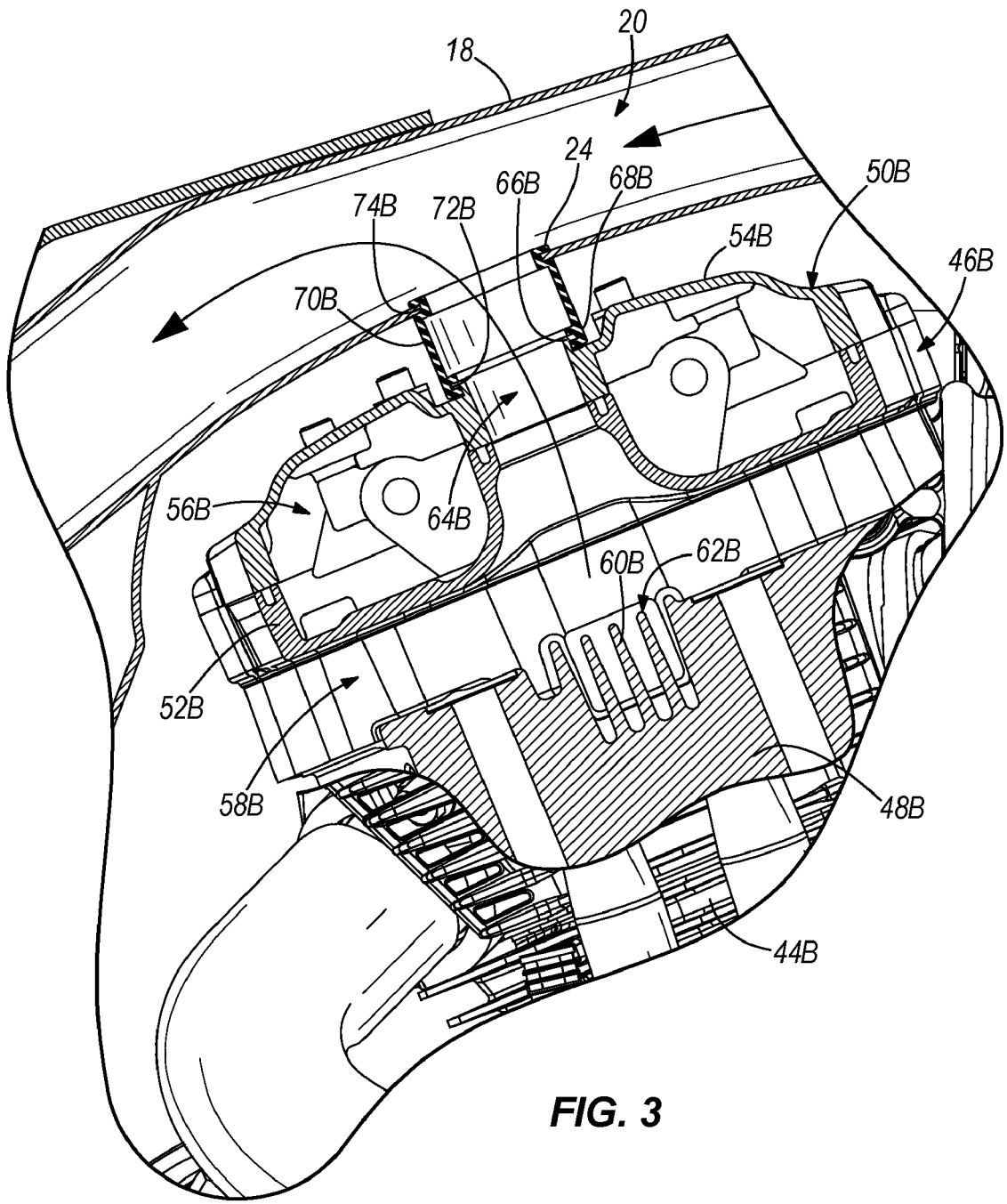
FIG. 3 is an enlarged view of a rear cylinder head assembly of the motorcycle shown in FIG. 2.
Figure 4:
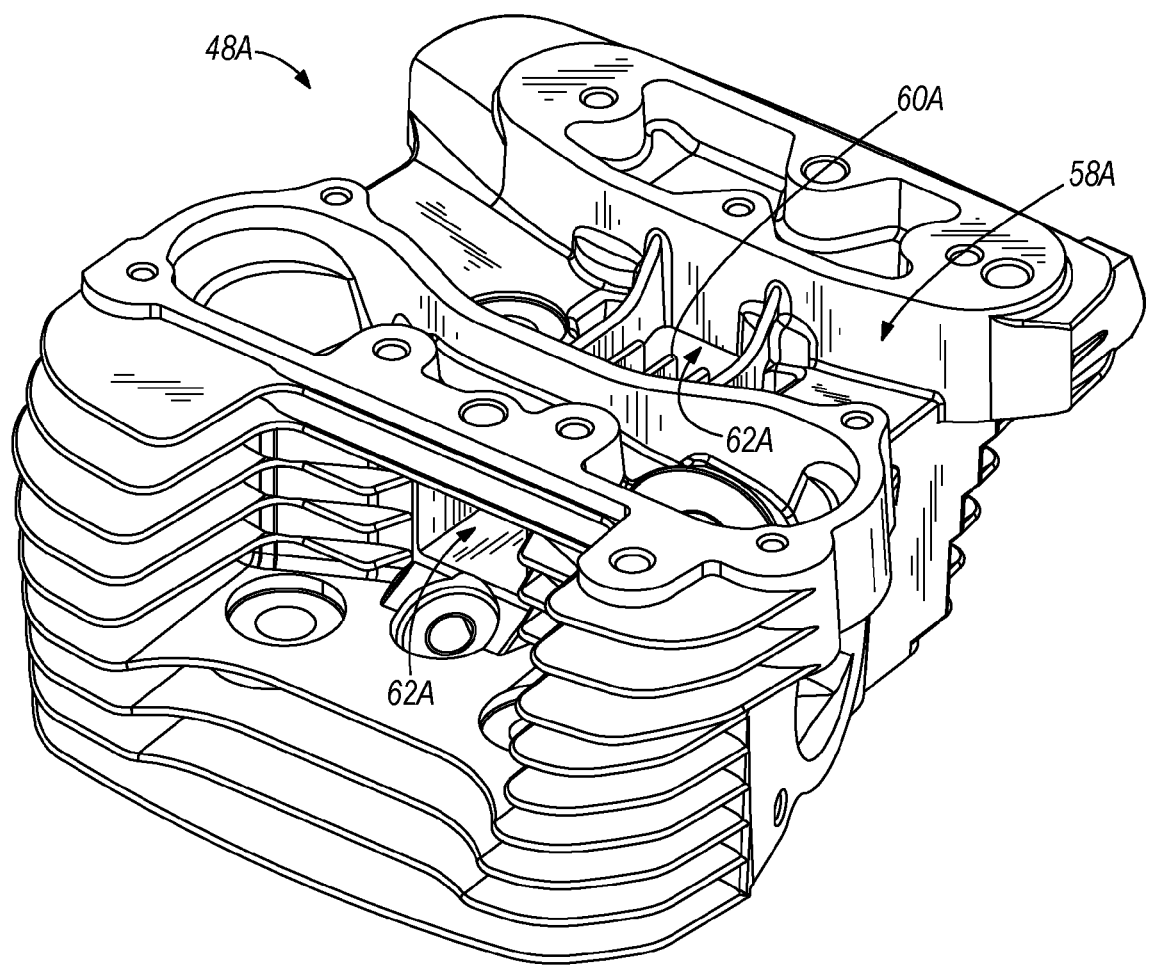
FIG. 4 is an enlarged view of a front cylinder head of the motorcycle shown in FIG. 2.

With reference to FIGS. 2 and 3, the cylinder head 48B defines a first cooling passageway 58B extending in the longitudinal direction (i.e., front-to-back) of the motorcycle 10. In particular, the first cooling passageway 58B extends from the front of the cylinder head 48B to the rear of the cylinder head 48B between a side portion of the cylinder head 48B that houses the upper ends of the pushrods and an opposite side portion that houses the upper ends of the intake and exhaust valves. The first cooling passageway 58B is a closed passageway and enclosed at the top by the bottom surface of the base 52B and enclosed at the bottom by the top surface of the cylinder head 48B. The top surface of the cylinder head 48B includes upwardly extending cooling fins 60B along the length of the first passageway 58B. FIG. 4 highlights the first and second passageways 58A, 62A on the front cylinder head 48A.

Referring back to FIGS. 2 and 3, the cylinder head 48B also defines a second cooling passage 62B extending in the lateral direction (i.e., side-to-side) of the motorcycle 10. In particular, the second cooling passageway 62B intersects and is generally perpendicular to the first cooling passageway 58B. The second cooling passageway 62B extends from one side of the cylinder head 48B opening approximately between the pushrods to the opposite side of the cylinder head 48B. The second cooling passageway 62B is closer to the cylinder 44B (i.e., lower) than the first cooling passageway 58B that is closer to the rocker box 50B (i.e., higher).

The rocker box 50B defines a centrally-located aperture referred to as a chimney. The chimney is a third cooling passageway 64B that extends in the generally vertical direction. In particular, the third cooling passageway 64B intersects the first and second cooling passageways 58B, 62B and then extends upwardly through the central portion of the rocker box 50B. The cover 54B includes a cooling port 66B in fluid communication with the third cooling passageway 64B. The cooling port 66B includes an outwardly-extending flange 68B.

The motorcycle 10 includes a front conduit 70A coupled between the cooling port 66A and the front frame inlet port 22 and a rear conduit 70B coupled between the cooling port 66B and the rear frame inlet port 24. The front and rear conduits 70A, 70B are compliant rubber boots. In other constructions, the conduits 70A, 70B can be any type of rigid or flexible tube. Each of the conduits 70A, 70B includes on one end an internal annular groove 72A, 72B that receives the annular flange 68A, 68B of the corresponding cooling port 66A, 66B and includes on the other end an external annular groove 74A, 74B that receives an annular portion of the backbone surrounding the corresponding frame inlet port 22, 24. This provides sealed pathways from the cooling ports 66A, 66B to the frame inlet ports 22, 24.

The motorcycle 10 includes a fan 76 positioned downstream of the cylinder head assemblies 46A, 46B and mounted to the frame 12. An extension tube 78 is coupled at one end to the downstream end of the fan 76 and at the opposite end to a debris deflector 80 adjacent to the rear wheel 32 such that the extension tube 78 is aligned with a hole 82 in the debris deflector 80. In other constructions, the fan 76 can be located anywhere along the airflow path between the cylinder head assemblies 46A, 46B and the area that the air is discharged onto the rear wheel 32.

The fan 76 is electrically coupled to a controller 84 of the motorcycle 10 and is automatically operable at an operating speed to draw air from the first, second, and third cooling passageways 58A, 62A, 64A, move air through the front cooling port 66A, through the front conduit 70A, the front frame inlet port 22, and into the interior cavity 20. In addition, the fan 76 is operable at the operating speed to draw air from the first, second, and third cooling passageways 58B, 62B, 64B, move air through the rear cooling port 66B, through the rear conduit 70B, the rear frame inlet port 24, and into the interior cavity 20. The fan 76 then draws air from the interior cavity 20 and discharges air in a downstream direction of the fan 76 through the frame outlet 26, the extension tube 78, and the hole 82 of the debris deflector 80 toward the rear wheel 32. As described herein, the operating speed refers to the speed (e.g., rpm) of the fan 76.

In this manner, cool air is drawn in through the cylinder head assemblies 46A, 46B to cool the cylinder heads 48A, 48B and direct the heat of the cylinder head assemblies 46A, 46B away from the rider resulting in greater rider comfort. In addition, high cylinder head assembly temperatures tend to reduce the allowable engine compression ratio, and therefore the resulting reduction in cylinder head assembly temperatures can improve engine performance.

The fan 76 is operable at various speeds and is electrically coupled through the controller 84 to a temperature sensor. The temperature sensor includes a thermocouple 86 that is mounted to the cylinder head 48B to measure the temperature of the engine 36. In other constructions, the thermocouple 86 could be mounted to measure any temperature of the motorcycle such as the oil temperature. The controller 84 operates to rotate the fan 76 at a first operating speed when the engine temperature sensed by the thermocouple 86 is within a first range, and rotate the fan 76 at a second higher speed with the temperature of the engine 36 is at a higher temperature. The controller 84, thermocouple 86, and fan 76 are operable when the ignition is on and when the ignition is off. Therefore, if the engine 36 is within the first or second temperature range when the ignition is turned off, then the controller 84 will continue to rotate the fan 76 until the engine 36 has sufficiently cooled to a desired temperature.

In other constructions, the fan 76 is controlled based on the speed of the motorcycle 10 when the engine 36 is running. For example, when the motorcycle 10 is not moving (i.e., idling) or is moving below a first speed the fan 76 would operate at a first operating speed and when the motorcycle 10 is moving faster than the first speed the fan 76 would operate at a second, slower operating speed or be shut down.

Figure 5:
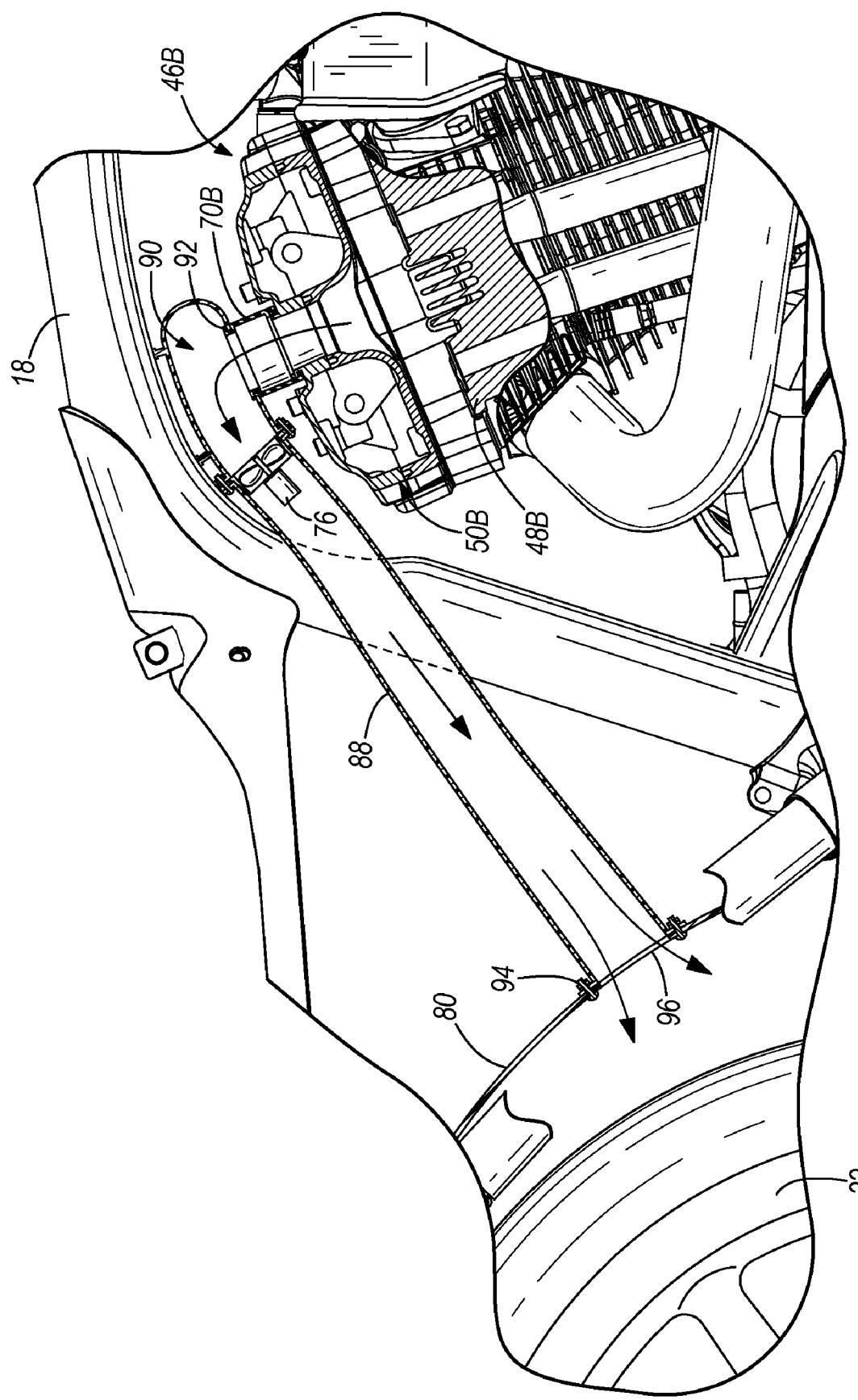
FIG. 5 is a cut-away side view of portions of a motorcycle according to another construction of the invention.

The construction illustrated in FIG. 5 is similar to the one illustrated in FIGS. 1-4 except that instead of using the backbone 18, a duct 88 is provided to remove the air from the rear cylinder head assembly 46B only. The rear cylinder head 48B is located in closest proximity to the rider and therefore has the greatest impact on rider comfort with respect to heat dissipated from the engine 36. The duct 88 is plastic and is mounted to the frame 12. The plastic duct 88 defines a plenum 90 and includes a duct inlet port 92 and two duct outlets 94 (only one of which is shown) in fluid communication with the plenum 90. The conduit 70B is coupled to the duct inlet port 92. The duct 88 is forked around the downwardly extending portion of the backbone 18 such that the outlets 94 are laterally offset from each other and positioned on opposite sides of the backbone 18. The duct 88 is coupled at its downstream ends to the debris deflector 80 such that the duct outlets 94 are aligned with corresponding holes 96 in the debris deflector 80.

The fan 76 is coupled within the plenum 90. The fan 76 is operable at various operating speeds to draw air from the from the first, second, and third cooling passageways 58B, 62B, 64B, move air through the cooling port 66B, through the conduit 70B, through the duct inlet port 92, and into the plenum 90. The fan 76 then draws air from the plenum 90 and discharges air from the duct outlets 94 and the holes 96 in the debris deflector 80 in the downstream direction toward the rear wheel 32.

Various features and advantages of the invention are set forth in the following claims.

What is claimed is:

1. A motorcycle comprising:
   a frame;
   an engine and transmission assembly coupled to the frame, the engine and transmission assembly including at least one cylinder head assembly having a cooling port and defining a cooling passageway in fluid communication with the cooling port and passing through at least a portion of the cylinder head assembly;
   a conduit coupled to the cooling port; and
   a fan in fluid communication with the conduit and operable at an operating speed to draw air from the cooling passageway, and move air through the cooling port and through the conduit.

2. The motorcycle of claim 1, wherein the conduit is a rubber boot.

3. The motorcycle of claim 1, further comprising a controller in electrical communication with the fan, the controller programmed to operate the fan at the operating speed when a temperature of the motorcycle exceeds a threshold temperature.

4. The motorcycle of claim 1, further comprising a rear wheel coupled for rotation to the frame, wherein the fan is operable to discharge air onto the rear wheel.

5. The motorcycle of claim 1, further comprising a plastic duct coupled to the frame, the plastic duct defining a plenum, the plastic duct having a duct inlet port and a duct outlet in fluid communication with the plenum, the conduit coupled to the duct inlet port, the fan being operable at the operating speed to draw air from the cooling passageway, move air through the cooling port, through the conduit, through the duct inlet port, through the plenum and through the duct outlet.

6. The motorcycle of claim 5, wherein the fan is positioned within the plenum.

7. The motorcycle of claim 1, wherein the frame includes a hollow portion that defines an interior volume, the hollow portion including a frame inlet port and a frame outlet in fluid communication with the interior volume, the conduit coupled to the frame inlet port, the fan being operable at the operating speed to draw air from the cooling passageway, move air through the cooling port, through the conduit, through the frame inlet port, through the interior volume, and through the frame outlet.

8. The motorcycle of claim 7, wherein the fan is positioned within the interior volume.

9. The motorcycle of claim 7, wherein the frame includes a steering head and a backbone coupled to the steering head and extending rearwardly of the steering head, wherein the backbone includes the hollow portion.

10. The motorcycle of claim 7, wherein the engine and transmission assembly includes a V-type internal-combustion engine, wherein the at least one cylinder head assembly includes a rear cylinder head assembly, the cooling port is a rear cooling port, the cooling passageway is a rear cooling passageway, the conduit is a rear conduit, the frame inlet port is a rear frame inlet port,
   wherein the hollow frame portion includes a front frame inlet port in fluid communication with the interior volume,
   wherein the engine transmission assembly includes a front cylinder head assembly having a front cooling port and defining a front cooling passageway in fluid communication with the front cooling port and passing through at least a portion of the front cylinder head assembly,
   wherein the motorcycle further comprises a front conduit coupled between the front cooling port and the front frame inlet port,
   wherein the fan is operable at the operating speed to draw air from the rear cooling passageway, move air through the rear cooling port, through the rear conduit, through the rear frame inlet port, through the interior volume, and through the frame outlet, and wherein the fan is operable at the operating speed to draw air from the front cooling passageway, move air through the front cooling port, through the front conduit, through the front frame inlet port, through the interior volume, and through the frame outlet.

11. The motorcycle of claim 1, wherein the cylinder head assembly includes a cylinder head and a rocker box coupled to a top of the cylinder head, the rocker box having a centrally-located, upwardly-opening aperture, the rocker box adjacent the aperture defining the cooling port.

12. A motorcycle comprising:
a frame having a hollow portion defining an interior volume and including a frame inlet port and a frame outlet in fluid communication with the interior volume;
an engine and transmission assembly coupled to the frame, the engine and transmission assembly including at least one cylinder head assembly including a cooling port and defining a cooling passageway passing through at least a portion of the cylinder head assembly; and
a fan in fluid communication with the cooling passageway and operable at an operating speed to draw air from the cooling passageway, move air through the cooling port, the frame inlet port, the interior volume, and the frame outlet.

13. The motorcycle of claim 12, wherein the frame includes a steering head and a backbone coupled to the steering head and extending rearwardly of the steering head, wherein the backbone includes the hollow portion.

14. The motorcycle of claim 12, wherein the fan is positioned within the interior volume.

15. The motorcycle of claim 12, wherein the engine and transmission assembly includes a V-type internal-combustion engine, wherein the at least one cylinder head assembly includes a rear cylinder head assembly, the cooling port is a rear cooling port, the cooling passageway is a rear cooling passageway, the frame inlet port is a rear frame inlet port,
wherein the frame includes a front inlet port in fluid communication with the interior volume,
wherein the engine and transmission assembly includes a front cylinder head assembly having a front cooling port and defining a front cooling passageway in fluid communication with the front cooling port and passing through at least a portion of the front cylinder head assembly,
wherein the fan is operable at the operating speed to draw air from the rear cooling passageway, move air through the rear cooling port, through the rear frame inlet port, through the interior volume, and through the frame outlet, and
wherein the fan is operable at the operating speed to draw air from the front cooling passageway, move air through the front cooling port, through the front frame inlet port, through the interior volume, and through the frame outlet.

16. The motorcycle of claim 15, further comprising:
a rear conduit coupled between the rear cooling port and the rear frame inlet port; and
a front conduit coupled between the front cooling port and the front frame inlet port.

17. The motorcycle of claim 16, wherein the front and rear conduits are rubber boots.

18. The motorcycle of claim 15, further comprising a controller in electrical communication with the fan, the controller programmed to operate the fan at the operating speed when the temperature of the rear cylinder head exceeds a threshold temperature.

19. The motorcycle of claim 15, further comprising a rear wheel coupled for rotation to the frame, wherein the fan is operable to discharge air onto the rear wheel.

20. A motorcycle comprising:
a frame including a steering head and a hollow backbone portion coupled to the steering head and extending rearwardly of the steering head, wherein the hollow backbone portion defines an interior volume and includes a rear frame inlet port, a front frame inlet port, and a frame outlet in fluid communication with the interior volume;
an engine and transmission assembly coupled to the frame and including a V-type internal-combustion engine having
a rear cylinder head assembly having a rear cooling port and defining a rear cooling passageway in fluid communication with the rear cooling port and passing through at least a portion of the rear cylinder head assembly, and
a front cylinder head assembly having a front cooling port and defining a front cooling passageway in fluid communication with the front cooling port and passing through at least a portion of the front cylinder head assembly;
a rear conduit coupled between the rear cooling port and the rear frame inlet port;
a front conduit coupled between the front cooling port and the front frame inlet port; and
a fan positioned downstream of the front and rear cylinder head assemblies, wherein the fan is operable at an operating speed to draw air from the rear cooling passageway, move air through the rear cooling port, through the rear conduit, through the rear frame inlet port, through the interior volume, and through the frame outlet in a downstream direction, and wherein the fan is operable at the operating speed to draw air from the front cooling passageway, move air through the front cooling port, through the front conduit, through the front frame inlet port, through the interior volume, and through the frame outlet.

21. A motorcycle comprising:
a frame;
an engine and transmission assembly coupled to the frame, the engine and transmission assembly including at least one cylinder head assembly having a cooling port and defining a cooling passageway in fluid communication with the cooling port and passing through at least a portion of the cylinder head assembly;
a conduit coupled to the cooling port; and
a fan in fluid communication with the conduit and operable at an operating speed to draw air from the cooling passageway, and move air through the cooling port and through the conduit,
wherein the cylinder head assembly includes a rocker box having a centrally-located, upwardly-opening aperture, the rocker box adjacent the aperture defining the cooling port.

22. The motorcycle of claim 11, wherein the cooling passageway is defined between a base of the rocker box and the top of the cylinder head.

23. The motorcycle of claim 22, wherein the cooling passageway is a first cooling passageway, and further comprising a second cooling passageway in fluid communication with the cooling port, the second cooling passageway being defined through at least a portion of the cylinder head and intersecting the first cooling passageway.

24. The motorcycle of claim 1, wherein the cooling passageway extends upwardly through at least a portion of the cylinder head assembly toward the cooling port.

25. The motorcycle of claim 24, wherein the cooling passageway is one of a plurality of intersecting cooling passageways passing through at least a portion of the cylinder head assembly.

26. The motorcycle of claim 25, wherein the cylinder head assembly includes a cylinder head, and wherein the plurality of intersecting cooling passageways includes a pair of cooling passageways in fluid communication with the cooling passageway that extends upwardly toward the cooling port, a first one of the pair of cooling passageways extending across a top of the cylinder head and a second one of the pair of cooling passageways extending through at least a portion of the cylinder head.

* * * * *